United States Patent
Allen

(10) Patent No.: US 8,207,709 B1
(45) Date of Patent: Jun. 26, 2012

(54) METHOD AND SYSTEM TO REDUCE GENERATOR SHOCK-LOADING AND BATTERY SHOCK-CHARGING FOLLOWING ENGINE START

(75) Inventor: Rex H. Allen, Douglass, KS (US)

(73) Assignee: Ametek, Inc., Wichita, KS (US)

( * ) Notice: Subject to any disclaimer, the term of this patent is extended or adjusted under 35 U.S.C. 154(b) by 411 days.

(21) Appl. No.: 12/430,034

(22) Filed: Apr. 24, 2009

Related U.S. Application Data

(60) Provisional application No. 61/047,730, filed on Apr. 24, 2008.

(51) Int. Cl.
*H02P 9/00* (2006.01)
(52) U.S. Cl. .......................................... 322/28
(58) Field of Classification Search .................. 322/28, 322/25, 27, 37; 700/286, 287, 288, 290
See application file for complete search history.

(56) References Cited

U.S. PATENT DOCUMENTS

| | | | | |
|---|---|---|---|---|
| 5,157,321 A * | 10/1992 | Kato et al. | ....................... | 322/28 |
| 7,078,881 B2 * | 7/2006 | Aoyama | ....................... | 322/28 |

\* cited by examiner

*Primary Examiner* — Nguyen N Hanh
(74) *Attorney, Agent, or Firm* — RatnerPrestia

(57) ABSTRACT

The system contains a voltage reference input positioned to be compared to an initial generator output voltage of an engine generator control unit by a subtractor circuit. A resistive voltage divider has at least one input series resistor, a subtractor input, at least two secondary resistors, and a ground. The input series resistor is disposed between the voltage reference input and the subtractor input. The secondary resistors are disposed between the subtractor input and the ground. At least two transistor switches connected between the secondary resistors and the ground. The reduced generator output voltages are from the input series resistor and the secondary resistors.

22 Claims, 4 Drawing Sheets

METHOD AND SYSTEM TO REDUCE GENERATOR SHOCK-LOADING AND BATTERY SHOCK-CHARGING FOLLOWING ENGINE START

CROSS REFERENCE TO RELATED APPLICATION

This application claims priority from U.S. Provisional Application 61/047,730, filed Apr. 24, 2008, the contents of which are incorporated hereby reference.

FIELD OF THE INVENTION

The present invention is generally related to starter-generators, and more particularly to starter-generator assemblies and to methods and systems to reduce generator shock-loading and battery shock-charging following engine start. The invention has particular utility in connection with starter-generators as used with aircraft, and will be described primarily in connection with such utility, although other utilities are contemplated.

BACKGROUND OF THE INVENTION

Often, aircraft, and other vehicles and equipment employ starter-generators for starting the engine(s), and once the engine(s) are running, operating as a generator for the vehicle needs and to recharge the batteries. An obvious advantage of a starter-generator is the elimination of the starter motor, and the weight and cost associated therewith. In order to simplify the system, starter-generators typically are designed to float-charge batteries, and thus are connected to the DC power bus without any charging circuitry to control battery terminal voltage and thereby charging current, or battery charging current and thereby terminal voltage. While simple, when the battery is first connected to the bus after being substantially discharged during an engine start, considerable initial charging current can be drawn (hundreds of amperes).

This initial heavy battery-charging current is a high-stress factor on many components involved in electrical power generation and distribution. First, the high initial charging current and associated thermal shock, temperature rise and internal gas pressure rise is detrimental to long battery life. Second, after the engine start, as the generator line contactor initially closes (with inevitable contact bounce for traditional electro-mechanical solenoid-type contactors), considerable contact arcing occurs as the contacts bounce while the battery is drawing a large initial recharging current. The closing of the line contactor with a high-current load is detrimental to contactor life. Third, the high charging current occurs at the termination of engine start, where engine speed is approximately at ground-idle. Since generator shaft rotation is slow, torque load is correspondingly high to draw the input power required to supply the electrical load. For a starter-generator, at start-termination the starter-generator rapidly transitions from supplying torque to the engine, to drawing a high torque from the engine; to generate close to rated output with an input speed approximately one-half of rated speed. The abrupt slamming of load on the accessory drive train and reversal of gear lash from supplying torque to drawing torque is detrimental to accessory gear life and fatigue life of the mechanical drive components of both engine and generator.

Thus, a heretofore unaddressed need exists in the industry to address the aforementioned deficiencies and inadequacies.

SUMMARY OF THE INVENTION

Embodiments of the present invention provide a system and method for regulating a voltage. Briefly described, in architecture, one embodiment of the system, among others, can be implemented as follows. The system contains a voltage reference input positioned to be compared to an initial generator output voltage of an engine generator control unit by a subtractor circuit. A resistive voltage divider has at least one input series resistor, a subtractor input, at least two secondary resistors, and a ground. The input series resistor is disposed between the voltage reference input and the subtractor input. The secondary resistors are disposed between the subtractor input and the ground. At least two transistor switches connected between the secondary resistors and the ground. The reduced generator output voltages from the input series resistor and the secondary resistors.

The present invention can also be viewed as providing methods of regulating a voltage to a subtractor circuit. In this regard, one embodiment of such a method, among others, can be broadly summarized by the following steps: providing a generator output voltage; creating an error signal by defining a difference between the generator output voltage from a voltage reference input; filtering the error signal to control a generator field excitation; attenuating the voltage reference input with a resistive voltage divider.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
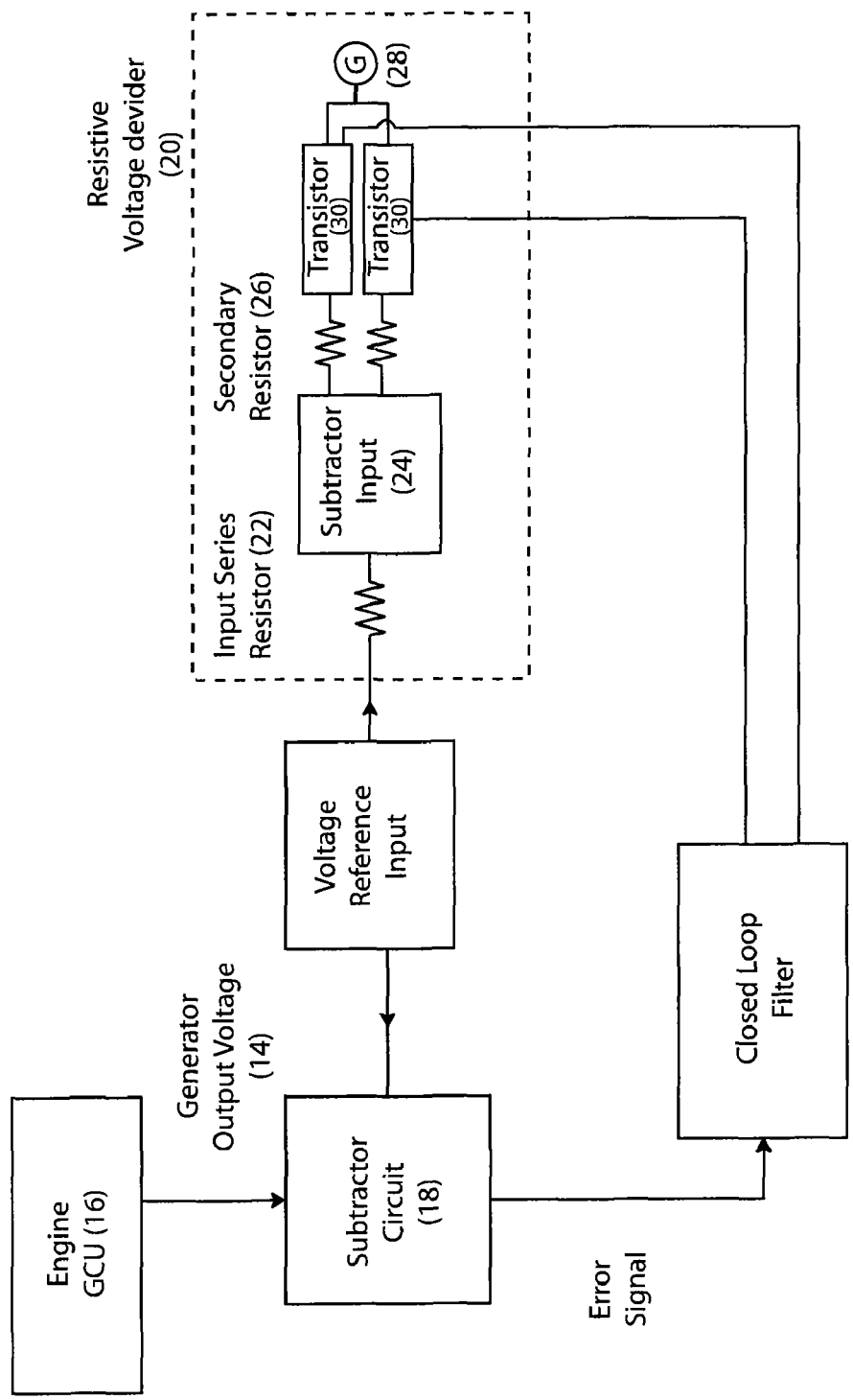
FIG. 1 is a block diagram illustrating a voltage regulator, in accordance with a first exemplary embodiment of the invention.

FIG. 1 is a block diagram illustrating the voltage regulator 10, in accordance with a first exemplary embodiment of the invention. The voltage regulator 10 contains a voltage reference input 12 positioned to be compared to an initial generator output voltage 14 of an engine generator control unit 16 by a subtractor circuit 18. A resistive voltage divider 20 has at least one input series resistor 22, a subtractor input 24, at least two secondary resistors 26, and a ground 28. The input series resistor 22 is disposed between the voltage reference input 12 and the subtractor input 24. The secondary resistors 26 are disposed between the subtractor input 24 and the ground 28. At least two transistor switches 30 are connected between the secondary resistors 26 and the ground 28. Further and additional description is provided in the attachment entitled, "Attachment A," which is incorporated herein.

Figure 2:
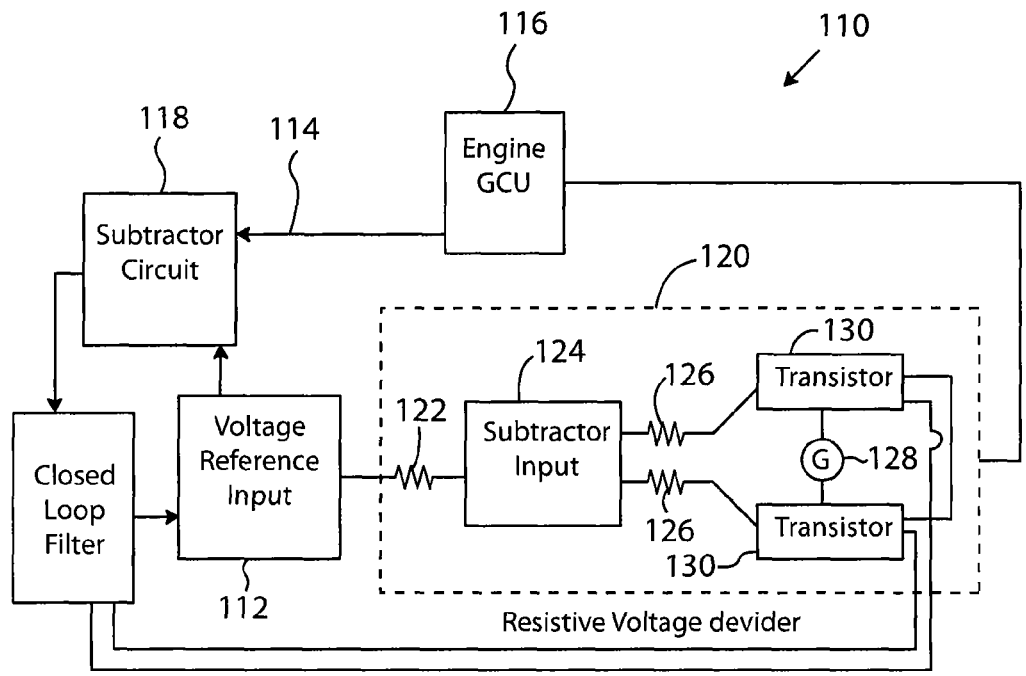
FIG. 2 is a schematic diagram illustrating a voltage regulator, in accordance with a second exemplary embodiment of the invention.

FIG. 2 is a schematic diagram illustrating a voltage regulator 110, in accordance with a second exemplary embodiment of the invention. The voltage regulator 110 contains a voltage reference input 112 positioned to be compared to an initial generator output voltage 114 of an engine generator control unit 116 by a subtractor circuit 118. A resistive voltage divider 120 has at least one input series resistor 122, a subtractor input 124, at least two secondary resistors 126, and a ground 128. The input series resistor 122 is disposed between the voltage reference input 112 and the subtractor input 124. The secondary resistors 126 are disposed between the subtractor input 124 and the ground 128. At least two transistor switches 130 are connected between the secondary resistors 126 and the ground 128. The engine generator control unit 116 is in communication with the transistor switches 130.

Figure 3A:
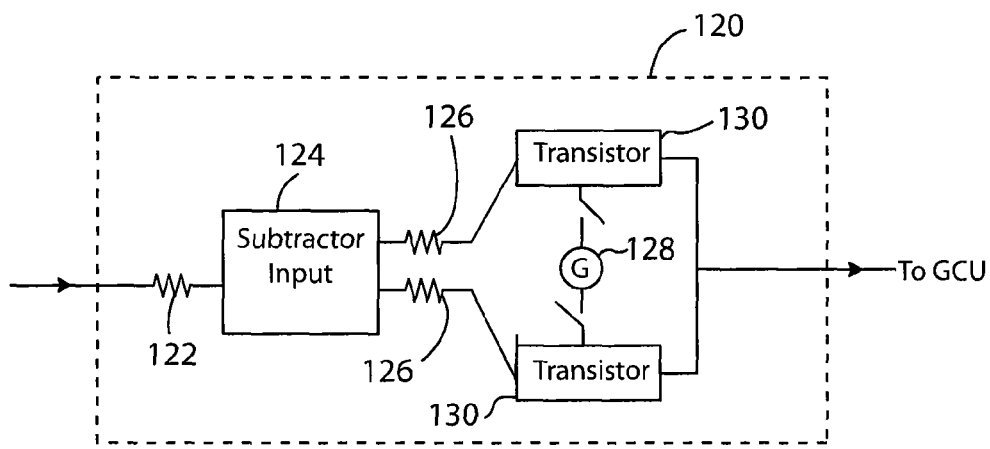
FIG. 3A is a schematic diagram illustrating a resistive voltage divider of FIG. 2, in accordance with the second exemplary embodiment of the invention.

FIG. 3A is a schematic diagram illustrating a resistive voltage divider 120 of FIG. 2, in accordance with the second exemplary embodiment of the invention. In FIG. 3A, the transistors 130 are both in an open position. As a result, the secondary resistors 126 are not connected to a ground 128.

Figure 3B:
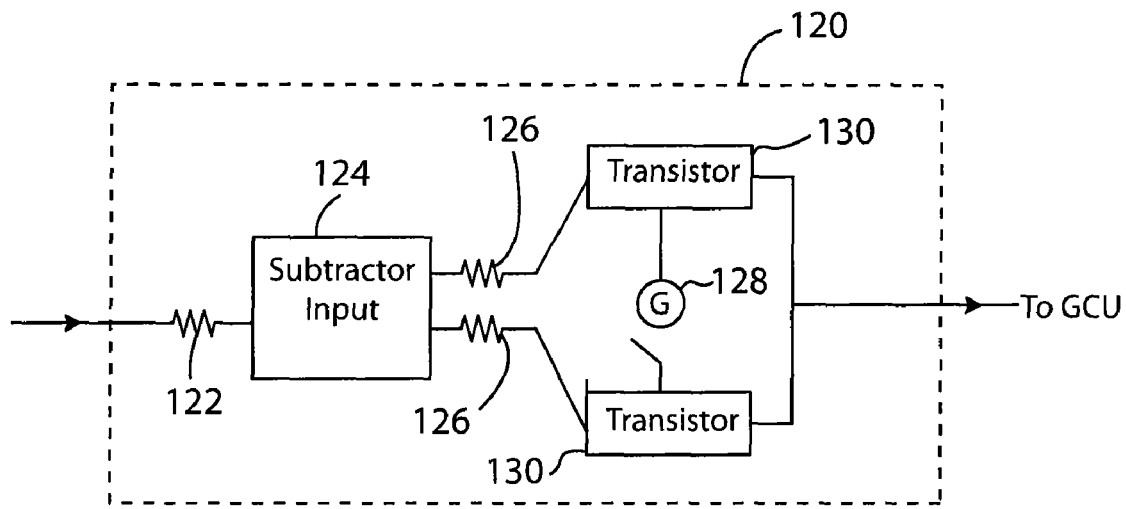
FIG. 3B is a schematic diagram illustrating a resistive voltage divider 120 for the voltage regulator of FIG. 2, wherein one secondary resistor 126 is connected to a ground 128, in accordance with a second exemplary embodiment of the invention.

FIG. 3B is a schematic diagram illustrating a resistive voltage divider 20 for the voltage regulator of FIG. 1, wherein one secondary resistor 26 is connected to a ground 28, in accordance with a second exemplary embodiment of the invention.

Figure 3C:
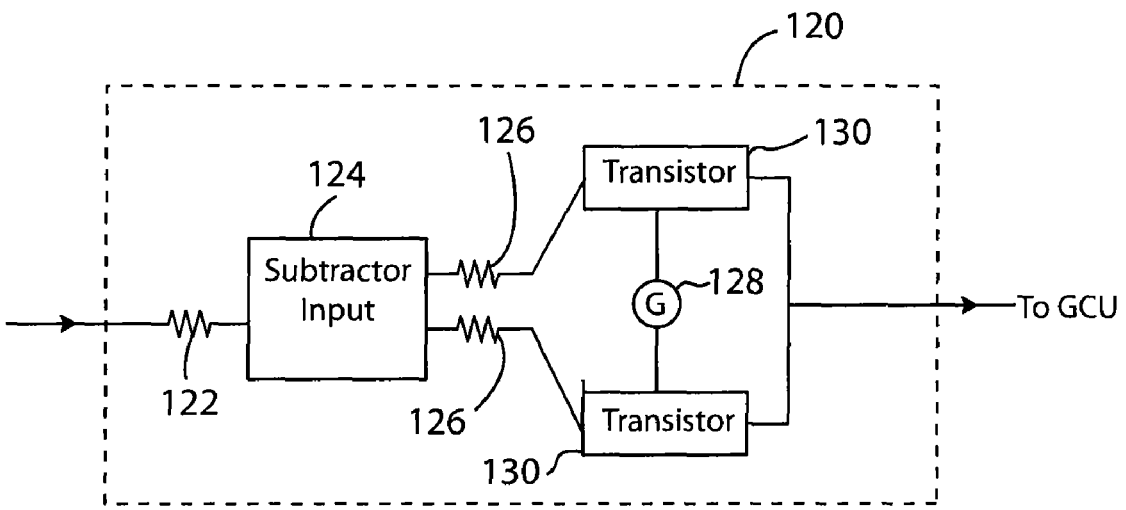
FIG. 3C is a schematic diagram illustrating a resistive voltage divider 120 for the voltage regulator of FIG. 2, wherein two secondary resistors 126 are connected to a ground 128, in accordance with a second exemplary embodiment of the invention.

FIG. 3C is a schematic diagram illustrating a resistive voltage divider 20 for the voltage regulator of FIG. 1, wherein two secondary resistors 26 are connected to a ground 28, in accordance with a second exemplary embodiment of the invention.

Figure 4:
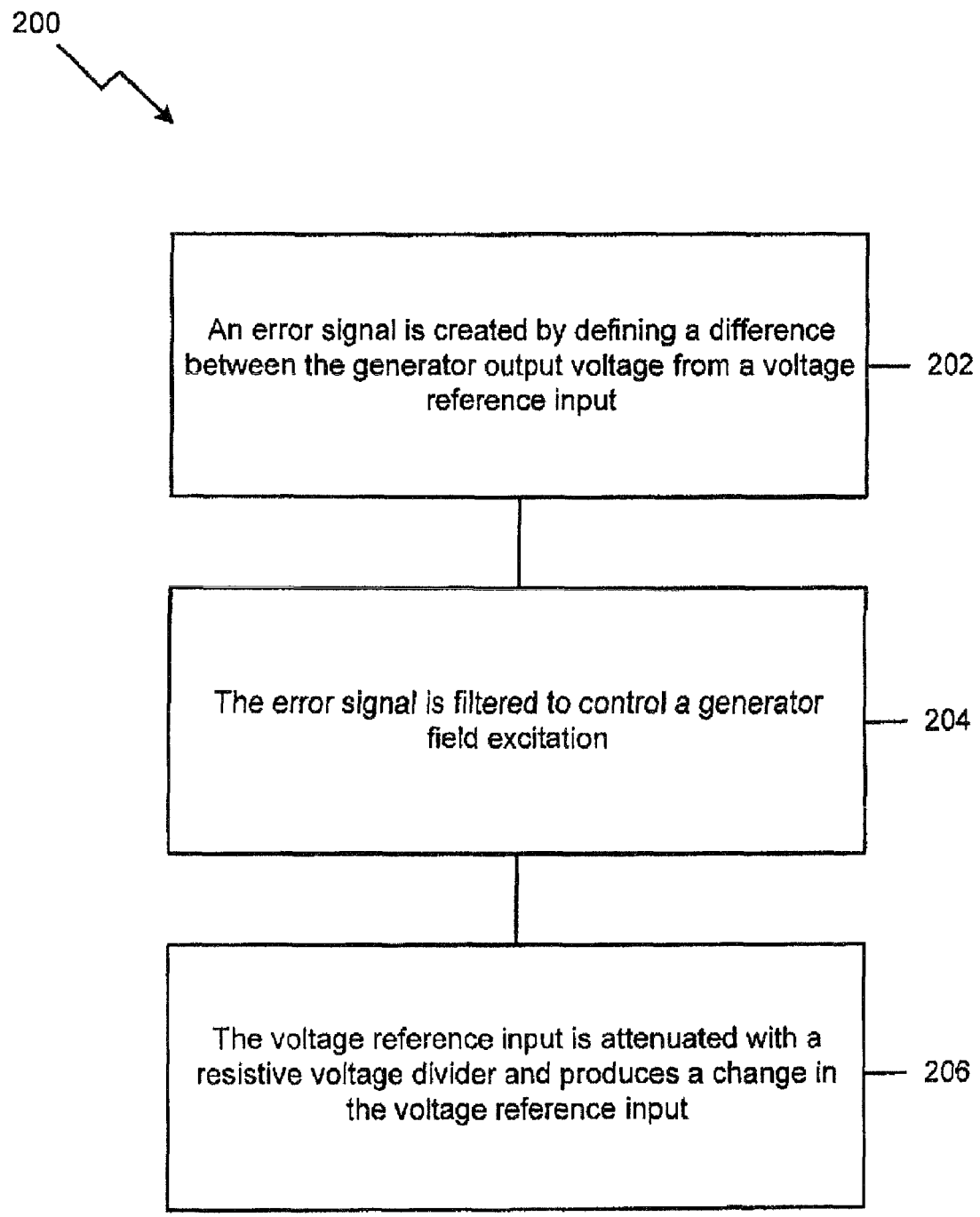
FIG. 4 is a flowchart illustrating a method of regulating a voltage to a subtractor circuit, in accordance with the first exemplary embodiment of the present invention.

FIG. 4 is a flowchart 200 illustrating a method of regulating a voltage to a subtractor circuit in the abovementioned voltage regulator 10 in accordance with the first exemplary embodiments of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 200, a generator output voltage 14 is provided. An error signal is created by defining a difference between the generator output voltage 14 from a voltage reference input 12 (block 202). The error signal is filtered to control a generator field excitation (block 204). The voltage reference input 12 is attenuated with a resistive voltage divider 20 and produces a change in the voltage reference input 12 (block 206).

The invention has been described in particular for use with aircraft. However, the invention has utility for various vehicles including all-terrain vehicles, three wheelers, go-carts, dune buggies, utility vehicles, snowmobiles, personal watercraft, boats with outboard motors, boats with inboard motors, scooters, motorcycles, tractors and other types of farm equipment, golf carts, etc., as well as equipment such as water pumps and emergency generators.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of regulating a voltage to a subtractor circuit, the method comprising the steps of:
   providing a generator output voltage;
   creating an error signal by defining a difference between the generator output voltage from a voltage reference input;
   filtering the error signal to control a generator field excitation; and
   attenuating the voltage reference input to the subtractor circuit with a resistive voltage divider.

2. The method of claim 1, further comprising the step of attenuating the voltage reference input through at least three resistors wherein at least one input series resistor located between the voltage reference input and a subtractor input and at least two secondary resistors located between the subtractor input and a ground.

3. An apparatus for regulating a voltage, the apparatus comprising:
   a voltage reference input positioned to be compared to an initial generator output voltage of an engine generator control unit by a subtractor circuit;
   a resistive voltage divider having at least one input series resistor, a subtractor input, at least two secondary resistors, and a ground, wherein the at least one input series resistor is disposed between the voltage reference input and the subtractor input, and the at least two secondary resistors are disposed between the subtractor input and the ground;
   at least two transistor switches connected between the at least two secondary resistors and the ground; and
   at least three reduced generator output voltages from the at least one input series resistor and the at least two secondary resistors.

4. The apparatus set forth in claim 3, wherein the secondary resistors are not grounded.

5. The apparatus set forth in claim 3, wherein at least one of the secondary resistors is grounded.

6. The apparatus set forth in claim 3, wherein at least two of the secondary resistors are grounded.

7. The apparatus set forth in claim 3, wherein the at least three reduced generator output voltages are greater than a nominal battery voltage.

8. The apparatus set forth in claim 3, wherein the engine generator control unit is in communication with the at least two transistor switches.

9. The apparatus of claim 3, wherein the subtractor circuit controls the transistor switches.

10. An integrated starter-generator apparatus for incorporation into a vehicle electrical system having:

a voltage reference input positioned to be compared to an initial generator output voltage of an engine generator control unit by a subtractor circuit;

a resistive voltage divider having at least one input series resistor, a subtractor input, at least two secondary resistors, and a ground, wherein the at least one input series resistor is disposed between the voltage reference input and the subtractor input, and the at least two secondary resistors are disposed between the subtractor input and the ground;

at least two transistor switches connected between the at least two secondary resistors and the ground; and at least three reduced generator output voltages from the at least one input series resistor and the at least two secondary resistors.

11. The apparatus of claim 10, wherein the subtractor circuit controls the transistor switches.

12. The apparatus set forth in claim 10, wherein the secondary resistors are not grounded.

13. The apparatus set forth in claim 10, wherein at least one of the secondary resistors is grounded.

14. The apparatus set forth in claim 10, wherein at least two of the secondary resistors are grounded.

15. The apparatus set forth in claim 10, wherein the at least three reduced generator output voltages are greater than a nominal battery voltage.

16. The apparatus set forth in claim 10, wherein the engine generator control unit is in communication with the at least two transistor switches.

17. An integrated starter-generator apparatus for incorporation into an aircraft electrical system having an internal combustion engine, wherein said starter-generator is selectively coupled to said internal combustion engine, said apparatus including:

a voltage reference input positioned to be compared to an initial generator output voltage of an engine generator control unit by a subtractor circuit;

a resistive voltage divider having at least one input series resistor, a subtractor input, at least two secondary resistors, and a ground, wherein the at least one input series resistor is disposed between the voltage reference input and the subtractor input, and the at least two secondary resistors are disposed between the subtractor input and the ground;

at least two transistor switches connected between the at least two secondary resistors and the ground; and at least three reduced generator output voltages from the at least one input series resistor and the at least two secondary resistors.

18. The apparatus of claim 17, wherein the subtractor circuit controls the transistor switches.

19. The apparatus of claim 17, wherein the secondary resistors are not grounded.

20. The apparatus set forth in claim 17, wherein at least one of the secondary resistors is grounded.

21. The apparatus as set forth in claim 17, wherein at least two of the secondary resistors are grounded.

22. The apparatus as set forth in claim 17, wherein the at least three reduced generator output voltages are greater than a nominal battery voltage.

* * * * *